US012489199B2

(12) United States Patent
Li et al.

(10) Patent No.: US 12,489,199 B2
(45) Date of Patent: Dec. 2, 2025

(54) BASE STATION ANTENNAS HAVING PARTIALLY REFLECTIVE SURFACE ISOLATION WALLS

(71) Applicant: Outdoor Wireless Networks LLC, Claremont, NC (US)

(72) Inventors: Haifeng Li, Allen, TX (US); Xiangyang Ai, Plano, TX (US); Rui An, Allen, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 157 days.

(21) Appl. No.: 18/531,781

(22) Filed: Dec. 7, 2023

(65) Prior Publication Data

US 2024/0213657 A1 Jun. 27, 2024

Related U.S. Application Data

(60) Provisional application No. 63/434,116, filed on Dec. 21, 2022.

(51) Int. Cl.

| | |
|---|---|
| ***H01Q 1/24*** | (2006.01) |
| ***H01Q 1/52*** | (2006.01) |
| ***H01Q 5/48*** | (2015.01) |
| ***H01Q 15/00*** | (2006.01) |
| ***H01Q 19/10*** | (2006.01) |

(Continued)

(52) U.S. Cl.
CPC ............. *H01Q 1/246* (2013.01); *H01Q 1/521* (2013.01); *H01Q 1/523* (2013.01); *H01Q 15/0013* (2013.01); *H01Q 15/0026* (2013.01); *H01Q 21/062* (2013.01); *H01Q 5/48* (2015.01); *H01Q 19/108* (2013.01); *H01Q 21/24* (2013.01)

(58) Field of Classification Search
CPC ............. H01Q 1/246; H01Q 1/52–525; H01Q 15/0006–0013; H01Q 15/0026; H01Q 21/062; H01Q 19/108; H01Q 5/48
See application file for complete search history.

(56) References Cited

U.S. PATENT DOCUMENTS

| | | | | |
|---|---|---|---|---|
| 11,165,149 | B2 * | 11/2021 | Rossiter | H01P 1/2005 |
| 11,264,727 | B2 * | 3/2022 | Zimmerman | H01Q 21/20 |
| 11,581,636 | B2 * | 2/2023 | Guo | H01Q 1/246 |

(Continued)

FOREIGN PATENT DOCUMENTS

| | | | | |
|---|---|---|---|---|
| EP | 3627619 A1 * | 3/2020 | | H01Q 15/0026 |
| JP | 2012065014 A * | 3/2012 | | H01Q 21/28 |
| WO | WO-2025017360 A1 * | 1/2025 | | H01Q 15/006 |

*Primary Examiner* — Ab Salam Alkassim, Jr.
(74) *Attorney, Agent, or Firm* — Myers Bigel, P.A.

(57) ABSTRACT

Base station antennas include a reflector, a first linear array of radiating elements extending forwardly from the reflector, the radiating elements in the first linear array configured to operate in a first frequency band, and a second linear array of radiating elements extending forwardly from the reflector, the radiating elements in the second linear array configured to operate in the first frequency band. These antennas further include an isolation wall that is positioned in between the first linear array of radiating elements and the second linear array of radiating elements. This isolation wall comprises at least one partially reflective surface that is configured to reflect, on average as a function of frequency, between 20% and 80% of incident radiation in the first frequency band.

18 Claims, 7 Drawing Sheets

(51) Int. Cl.
*H01Q 21/06* (2006.01)
*H01Q 21/24* (2006.01)

(56) References Cited

U.S. PATENT DOCUMENTS

| | | | | |
|---|---|---|---|---|
| 12,155,121 | B2 * | 11/2024 | Huang | H01Q 21/08 |
| 12,191,574 | B2 * | 1/2025 | Hwang | H01Q 21/065 |
| 2002/0021246 | A1 * | 2/2002 | Martek | H01Q 25/00 342/373 |
| 2013/0241778 | A1 * | 9/2013 | Orime | H01Q 15/0006 343/700 MS |
| 2016/0344093 | A1 * | 11/2016 | Tagi | H01Q 1/525 |
| 2017/0346179 | A1 * | 11/2017 | Wu | H01Q 1/523 |
| 2018/0108985 | A1 * | 4/2018 | Wang | H01Q 1/525 |
| 2018/0277946 | A1 * | 9/2018 | Murata | H01Q 1/48 |
| 2018/0358710 | A1 * | 12/2018 | Toyao | H01Q 15/148 |
| 2019/0166686 | A1 * | 5/2019 | Jo | H05K 1/0298 |
| 2019/0393597 | A1 * | 12/2019 | Kosaka | H01Q 15/14 |
| 2020/0076072 | A1 * | 3/2020 | Keyrouz | H01P 1/2005 |
| 2020/0091599 | A1 * | 3/2020 | Nakamura | H01Q 1/38 |
| 2020/0136247 | A1 * | 4/2020 | Ai | H01Q 1/523 |
| 2020/0176873 | A1 * | 6/2020 | Segador Alvarez | H01Q 1/246 |
| 2020/0358173 | A1 * | 11/2020 | Jong | H01Q 1/243 |
| 2020/0411993 | A1 * | 12/2020 | Jia | H01Q 9/0414 |
| 2021/0296785 | A1 * | 9/2021 | Zimmerman | H01Q 15/08 |
| 2021/0320409 | A1 * | 10/2021 | Luo | H01Q 21/30 |
| 2021/0391647 | A1 * | 12/2021 | Guo | H01Q 19/106 |
| 2022/0029279 | A1 * | 1/2022 | Jiang | H01Q 19/10 |
| 2022/0255222 | A1 * | 8/2022 | Korva | H01Q 21/065 |
| 2022/0352648 | A1 * | 11/2022 | Jeong | H01Q 1/246 |
| 2023/0104131 | A1 * | 4/2023 | Varnoosfaderani | H01Q 21/062 343/702 |
| 2023/0299469 | A1 * | 9/2023 | Kasani | H01Q 21/0025 343/835 |
| 2024/0039145 | A1 * | 2/2024 | Liu | H01Q 15/0013 |
| 2024/0235058 | A1 * | 7/2024 | Fu | H01Q 1/521 |

* cited by examiner

BASE STATION ANTENNAS HAVING PARTIALLY REFLECTIVE SURFACE ISOLATION WALLS

CROSS-REFERENCE TO RELATED APPLICATION

The present application claims priority under 35 U.S.C. § 119 to U.S. Provisional patent application Ser. No. 63/434,116, filed Dec. 21, 2022, the entire content of which is incorporated herein by reference.

FIELD

The present invention generally relates to radio communications and, more particularly, to base station antennas utilized in cellular and other communications systems.

BACKGROUND

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. Most cells are divided into a plurality of "sectors," and separate base station antennas provide coverage to each of the sectors. The base station antennas are often mounted on a tower or other raised structure, with the radiation pattern ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. A vertically-extending column of radiating elements that is coupled to a single radio port (or to two radio ports if the radiating elements are dual polarization radiating elements) is typically referred to as a "linear array" of radiating elements. Herein, "vertical" refers to a direction that is generally perpendicular relative to the plane defined by the horizon. References will also be made herein to the "azimuth" and "elevation" planes. The azimuth plane refers to a horizontal plane that bisects the base station antenna that is parallel to the plane defined by the horizon. The elevation plane refers to a plane that is perpendicular to the azimuth plane that bisects the front surface of the base station antenna.

When an RF signal is fed from a radio port to the first polarization (or second polarization) radiators of the radiating elements in a linear array, the RF energy is radiated into free space through the radiating elements, generating a radiation pattern or "antenna bean." The shape of the antenna beam is defined by, among other things, the characteristics of the individual radiating elements, the characteristics of the linear array (e.g., the spacing between adjacent radiating elements) and by the magnitude of phase of the sub-components of the RF signal that are fed to each individual radiating element in the linear array. Antenna beams are often characterized by their Half Power Beam Width or "HPBW" in the azimuth and elevation planes. The HPBW refers to the number of degrees in the designated plane where the radiated power is within 3 dB (50%) of the peak power of the antenna beam.

A common base station configuration is a "three sector" configuration in which a cell is divided into three 120° sectors in the azimuth plane, and the base station includes three base station antennas that provide coverage to the three respective sectors. In a three sector configuration, the antenna beams generated by each base station antenna typically have a HPBW in the azimuth plane of about 65°, as such an antenna beam may provide good coverage throughout a 120° sector without having significant RF energy spill over into the other two sectors.

Cellular communications are primarily performed in three different frequency ranges, which are commonly referred to as the "low-band," "mid-band" and "high-band" frequency ranges. The low-band frequency range is generally defined as the 696-960 MHz frequency range (or more recently as the 617-960 MHz frequency range). The mid-band frequency range is generally defined as the 1695-2690 MHz frequency range (or, more recently as the 1427-2690 MHz frequency range). The high-band frequency range is more variable in nature, but may include different ranges of frequencies in the 3.1-5.8 GHz frequency range. Cellular operators are licensed to use small sub-bands in each of these frequency ranges, where the sub-bands will vary with geographic location and operator. Consequently, particularly for the low-band and mid-band frequency ranges, base station antennas typically include linear arrays that support service across the full low-band and mid-band frequency ranges so that the antennas can be used by any operator in any geographic location.

There is significant interest in base station antennas that include two or more linear arrays of radiating elements that support service in the same frequency band, since such base station antennas can support service in two sub-bands of the frequency band and/or support 4×MIMO communications, where MIMO stands for "multi-input-multi-output. The term Z×MIMO refers to a communication technique where a baseband data stream is sub-divided into Z sub-streams (where Z is a positive integer greater than 1) that are used to generate Z RF signals that are transmitted through multiple different arrays of radiating elements. The different arrays are, for example, spatially separated from one another and/or at orthogonal polarizations so that the transmitted RF signals will be sufficiently decorrelated. The Z RF signals are recovered at the receiver and demodulated and decoded to recover the original Z data sub-streams, which are then recombined. The use of MIMO transmission techniques may help overcome the negative effects of multipath fading, and may be particularly effective in urban environments where reflections may increase the level of decorrelation between the RF signals.

Unfortunately, it can be challenging to implement base station antennas that have two or more arrays of low-band radiating elements in a commercially acceptable manner. The size of a radiating element is inversely correlated with its frequency of operation, and hence the low-band radiating elements are usually the largest radiating elements in a base station antenna. As such, providing an antenna that includes two arrays of low-band radiating elements usually results in an antenna having a width exceeding 550 mm, which is undesirable.

FIG. 1 is a schematic front view of a conventional base station antenna 1 (with the radome thereof removed) that illustrates the difficulty of providing a narrow width base station antenna that includes two linear arrays of low-band radiating elements.

As shown in FIG. 1, base station antenna 1 includes first and second linear arrays 20-1, 20-2 of dual polarization low-band radiating elements 22. Herein, when multiple of the same elements are included in an antenna, the elements may be referred to individually by their full reference numeral (e.g., linear array 20-2) and collectively by the first part of their reference numerals (e.g., the linear arrays 20). Each low-band linear array 20-1, 20-2 comprises a vertically-extending column of radiating elements. It should be noted that the radiating elements in a linear array are sometimes staggered to a degree in the horizontal direction, which can reduce the azimuth HPBW of the antenna beams generated by the linear array. Such arrays are still considered to be "linear arrays" for purposes of the present disclosure even though the radiating elements are not all aligned along a vertical axis. While not shown in FIG. 1, the base station antenna 1 typically will also include two or four linear arrays of mid-band radiating elements as the mid-band radiating elements are smaller and can be mounted behind the low-band radiating elements 22 without increasing the width of the base station antenna 1.

As shown in FIG. 1, the low-band radiating elements 22 are mounted to extend forwardly from a reflector 2. Each radiating element 22 is schematically shown using an "X" to indicate that the radiating elements are implemented as slant −45°/+45° polarization radiating elements that each include a first dipole radiator 24-1 that transmits and receives RF radiation having a slant −45° linear polarization and a second dipole radiator 24-2 that transmits and receives RF radiation having a slant +45° linear polarization. The first dipole radiator 24-1 of each low-band radiating element 22 in the first linear array 20-1 is coupled to a first low-band RF port 26-1 through a first feed network (not shown), and the second dipole radiator 24-2 of each low-band radiating element 22 in the first linear array 20-1 is coupled to a second low-band RF port 26-2 through a second feed network (not shown). Thus, RF signals input at RF port 26-1 are passed to the first dipole radiators 24-1 of the radiating elements 22 of the first low-band linear array 20-1 where they are emitted into free space to generate a first low-band antenna beam (having a +45° polarization), and RF signals input at RF port 26-2 are passed to the second dipole radiators 24-2 of the radiating elements 22 of the first low-band linear array 20-1 to generate a second low-band antenna beam (having a −45° polarization). The second low-band linear array 20-2 is coupled to the third and fourth low-band RF ports 26-3, 26-4 in the same manner and hence can generate third and fourth low-band antenna beams.

Base station antennas having the design of base station antenna 1 will typically have a width that exceeds 550 mm. Antennas having such large widths are heavy, have high wind loading, and may exceed local ordinances governing the permissible sizes for base station antennas. While the width of the antenna could be reduced by decreasing the lateral spacing between the linear arrays 20-1, 20-2, spacing the low-band linear arrays 20-1, 20-2 closer together acts to increase the degree of signal coupling between the linear arrays 20-1, 20-2 and this "parasitic" coupling can itself lead to an undesired increase in HPBW. Moreover, in many cases the size of each low-band radiating element 22 is reduced as much as possible to decrease the width of the base station antenna, but the smaller low-band radiating elements 22 have larger azimuth HPBWs and thus the generated antenna beams will tend to have reduced gain and/or spill over into neighboring sectors. Consequently, it may be difficult to provide base station antennas that have two or more arrays of low-band radiating elements in a commercially acceptable manner.

SUMMARY

Pursuant to embodiments of the present invention, base station antennas are provided that comprise a reflector; a first linear array of radiating elements extending forwardly from the reflector, the radiating elements in the first linear array configured to operate in a first frequency band; a second linear array of radiating elements extending forwardly from the reflector, the radiating elements in the second linear array configured to operate in the first frequency band; and an isolation wall positioned in between the first linear array of radiating elements and the second linear array of radiating elements, the isolation wall comprising a partially reflective surface that is configured to reflect, on average as a function of frequency, between 20% and 80% of incident radiation in the first frequency band.

In some embodiments, the partially reflective surface comprises a plurality of metal rings.

In some embodiments, the plurality of metal rings comprise at least one column of metal rings.

In some embodiments, the plurality of metal rings comprise a plurality of columns of metal rings.

In some embodiments, a first of the plurality of columns of metal rings is positioned forwardly of a second of the plurality of columns of metal rings.

In some embodiments, the first and second linear arrays of radiating elements extend in a longitudinal direction of the base station antenna, and are spaced apart from one another in a transverse direction of the base station antenna.

In some embodiments, a second of the plurality of columns of metal rings and a third of the plurality of columns of metal rings are spaced apart from each other in the transverse direction of the base station antenna.

In some embodiments, a fourth of the plurality of columns of metal rings is spaced apart from both the second of the plurality of columns of metal rings and the third of the plurality of columns of metal rings in the transverse direction.

In some embodiments, a first of the plurality of columns of metal rings is positioned forwardly of the second, third and fourth of the plurality of columns of metal rings.

In some embodiments, a first number of the plurality of columns of metal rings are interposed between feed stalks of the radiating elements in the first linear array of radiating elements and feed stalks of the radiating elements in the second linear array of radiating elements, and a second number of the plurality of columns of metal rings are interposed between dipole radiators of the radiating elements in the first linear array of radiating elements and dipole radiators of the radiating elements in the second linear array of radiating elements, where the first number exceeds the second number.

In some embodiments, the plurality of columns of metal rings includes a total of four columns of metal rings, wherein the first number is three and the second number is one.

In some embodiments, a first of the plurality of columns of metal rings is positioned behind the dipole radiators of the radiating elements in the first linear array of radiating elements so that the dipole radiators of the radiating elements in the first linear array of radiating elements overlap the first of the plurality of columns of metal rings in the forward direction.

In some embodiments, some of the metal rings extend farther forwardly from the reflector than do the dipole arms of the radiating elements in the first and second linear arrays of radiating elements.

In some embodiments, at least two of the plurality of columns of metal rings are aligned in the transverse direction and spaced apart from each other in the forward direction.

In some embodiments, the isolation wall comprises at least a first printed circuit board, and wherein at least some of the plurality of columns of metal rings are formed as metal patterns on the first printed circuit board.

Pursuant to further embodiments of the present invention, base station antennas are provided that comprise a reflector; a first linear array of radiating elements extending forwardly from the reflector, the radiating elements in the first linear array configured to operate in a first frequency band; a second linear array of radiating elements extending forwardly from the reflector, the radiating elements in the second linear array configured to operate in the first frequency band; and an isolation wall positioned in between the first linear array of radiating elements and the second linear array of radiating elements, the isolation wall comprising one or more first columns of metal rings that are interposed between feed stalks of the radiating elements in the first linear array of radiating elements and feed stalks of the radiating elements in the second linear array of radiating elements, and one or more second columns of metal rings that are interposed between dipole radiators of the radiating elements in the first linear array of radiating elements and dipole radiators of the radiating elements in the second linear array of radiating elements, and wherein the isolation wall includes more first columns of metal rings than second columns of metal rings.

In some embodiments, the isolation wall includes at least three first columns of metal rings.

In some embodiments, the isolation wall includes a single second column of metal rings.

In some embodiments, the isolation wall includes a total of three first columns of metal rings, and wherein the single second column of metal rings is aligned in the forward direction with a middle one of the three first columns of metal rings.

In some embodiments, the first and second linear arrays of radiating elements extend in a longitudinal direction of the base station antenna, and are spaced apart from one another in a transverse direction of the base station antenna.

In some embodiments, a first of the first columns of metal rings is positioned behind the dipole radiators of the radiating elements in the first linear array of radiating elements so that the dipole radiators of the radiating elements in the first linear array of radiating elements overlap the first of the first columns of metal rings in the forward direction.

In some embodiments, the metal rings in the one or more second columns of metal rings extend farther forwardly from the reflector than do the dipole arms of the radiating elements in the first and second linear arrays of radiating elements.

In some embodiments, the isolation wall is configured to reflect, on average, between 20% and 80% of incident radiation in the first frequency band.

Pursuant to still further embodiments of the present invention, base station antennas are provided that comprise a reflector; a first linear array of radiating elements extending forwardly from the reflector, the radiating elements in the first linear array configured to operate in a first frequency band; a second linear array of radiating elements extending forwardly from the reflector, the radiating elements in the second linear array configured to operate in the first frequency band; and an isolation wall positioned in between the first linear array of radiating elements and the second linear array of radiating elements, wherein the isolation structure extends farther forwardly from the reflector than do the dipole arms of the radiating elements in the first and second linear arrays of radiating elements.

In some embodiments, the isolation wall includes a plurality of columns of metal rings.

In some embodiments, a first of the plurality of columns of metal rings is positioned forwardly of a second of the plurality of columns of metal rings.

In some embodiments, the first and second linear arrays of radiating elements extend in a longitudinal direction of the base station antenna, and are spaced apart from one another in a transverse direction of the base station antenna, and wherein a second of the plurality of columns of metal rings and a third of the plurality of columns of metal rings are spaced apart from each other in the transverse direction of the base station antenna.

In some embodiments, a fourth of the plurality of columns of metal rings is spaced apart from both the second of the plurality of columns of metal rings and the third of the plurality of columns of metal rings in the transverse direction.

In some embodiments, a first of the plurality of columns of metal rings is positioned forwardly of the second, third and fourth of the plurality of columns of metal rings.

In some embodiments, a first of the plurality of columns of metal rings is positioned behind the dipole radiators of the radiating elements in the first linear array of radiating elements so that the dipole radiators of the radiating elements in the first linear array of radiating elements overlap the first of the plurality of columns of metal rings in the forward direction.

Pursuant to additional embodiments of the present invention, base station antennas are provided that comprise a reflector; a first linear array of radiating elements extending forwardly from the reflector, the radiating elements in the first linear array configured to operate in a first frequency band; a second linear array of radiating elements extending forwardly from the reflector, the radiating elements in the second linear array configured to operate in the first frequency band; and an isolation wall positioned in between the first linear array of radiating elements and the second linear array of radiating elements, the isolation wall comprising a first dielectric substrate that has a first metal pattern formed thereon and a second dielectric substrate that has a second metal pattern formed thereon.

In some embodiments, the first metal pattern comprises a first column of metal rings and the second metal pattern comprises a second column of metal rings.

In some embodiments, a first column of metal rings is positioned forwardly of the second column of metal rings.

In some embodiments, the first metal pattern further comprises a third column of metal rings, and wherein a first column of metal rings is positioned forwardly of the second column of metal rings.

In some embodiments, the first dielectric substrate further has a third metal pattern formed thereon on the opposite side of the first dielectric substrate from the first metal pattern, where the third metal pattern comprises a fourth column of metal rings.

In some embodiments, the second, third and fourth columns of metal rings are spaced apart from each other in a transverse direction of the base station antenna.

In some embodiments, the first column of metal rings is interposed between dipole radiators of the radiating elements in the first linear array of radiating elements and dipole radiators of the radiating elements in the second linear array of radiating elements, and the second, third and fourth columns of metal rings are interposed between feed stalks of the radiating elements in the first linear array of radiating elements and feed stalks of the radiating elements in the second linear array of radiating elements.

In some embodiments, the third column of metal rings is positioned behind the dipole radiators of the radiating elements in the first linear array of radiating elements, and the fourth column of metal rings is positioned behind the dipole radiators of the radiating elements in the second linear array of radiating elements.

In some embodiments, the first column of metal rings extends farther forwardly from the reflector than do the dipole arms of the radiating elements in the first and second linear arrays of radiating elements.

DETAILED DESCRIPTION

Figure 1:
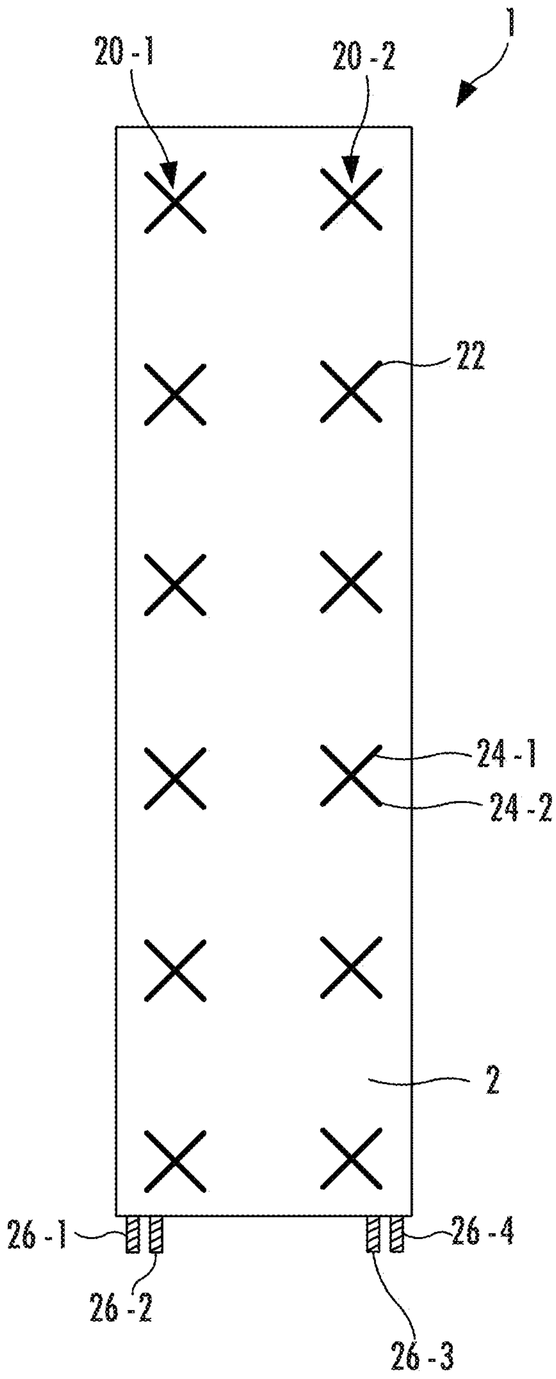
FIG. 1 PRIOR ART
FIG. 1 is a schematic front view of a conventional base station antenna (with the radome removed) that includes two linear arrays of low-band radiating elements.

Most modern base station antennas include antenna arrays that are formed using dual polarization radiating elements. A dual polarization radiating element refers to a radiating element that has first and second radiators that transmit/receive RF signals at orthogonal polarizations. The use of dual polarization radiating elements allows the number of antenna beams generated by an antenna to be doubled as compared to an antenna that uses single polarization radiating elements, typically with only a minimal increase in the size of the antenna. In conventional antennas that include one or more linear arrays (columns) of dual polarization radiating elements, all of the first polarization radiators in each column of radiating elements are typically coupled to a first RF port, and all of the second polarization radiators in the column of radiating elements are coupled to a second RF port.

As discussed above, base station antennas that include two linear arrays of low-band radiating elements tend to be overly wide, as the physical size of the low-band radiating elements is large. While it is often possible to shrink the size of the low-band radiating elements to an extent, which allows a reduction in the width of the antenna, the smaller low-band radiating elements generate individual antenna beams having larger azimuth HPBWs. Antenna beams having larger azimuth HPBWs tend to exhibit lower antenna gains and have increased interference with neighboring sectors. Another way to decrease the width of a base station antenna that includes two linear arrays of low-band radiating elements is to decrease the separation between the two linear arrays. This, however, results in increased coupling between the two linear arrays, which can distort the antenna beams generated by the two linear arrays (typically by increasing the azimuth HPBW by "pulling" radiation emitted by each linear array in the direction of the other linear array), decreased co-polarization isolation, decreased cross-polarization isolation and decreased self isolation.

One way to decrease the coupling between two closely spaced-apart linear arrays of low-band radiating elements is to place a metal isolation wall between the two low-band linear arrays. The metal isolation wall can significantly reduce the coupling between the two linear arrays, and hence the above-described adverse effects of decreasing the spacing between the two linear arrays can mostly be alleviated through the use of the metal isolation wall. However, if the base station antenna includes linear arrays of mid-band radiating elements (which is almost always the case), then the metal isolation wall acts to partially block the radiation emitted by the smaller mid-band radiating elements, significantly disrupting the shape of the mid-band antenna beams. Moreover, strong low-band currents may flow on the metal isolation wall in response to RF emission by the low-band radiating elements, and these currents result in additional low-band radiation (i.e., the isolation wall acts as a parasitic element) that acts to broaden the azimuth HPBW of the antenna beams generated by the low-band linear arrays.

U.S. Patent Publication No. 2021/0391647, which is incorporated herein by reference, suggests positioning an isolation wall that comprises a frequency selective surface in between two linear arrays of low-band radiating elements. The frequency selective surface may be configured to substantially pass RF radiation in the operating frequency range of the mid-band radiating elements while substantially blocking RF radiation in the operating frequency band of the low-band radiating elements. The use of such a frequency selective surface isolation wall allows positioning the low-band linear arrays close together without adversely affecting the performance of the mid-band linear arrays. However, the frequency selective surface isolation wall may adversely affect the shape of the antenna beams generated by the low-band arrays.

Pursuant to embodiments of the present invention, base station antennas are provided that include isolation walls that comprise one or more partially reflective surfaces. Partially reflective surfaces are a known type of frequency selective surface that reflects an intermediate amount of RF energy incident thereon in a given frequency range. As the term is used herein, a partially reflective surface refers to a surface that reflects, on average across the given frequency range, between 20% and 80% of the RF radiation in the given frequency range incident thereon. In some embodiments, the given frequency range may be the operating frequency range of the low-band radiating elements in the antenna and the partially reflective surface may be substantially transparent to RF energy in the mid-band operating frequency range.

In some embodiments, the isolation wall may comprise one or more rows of metallic rings. Each row of metallic rings may comprise a partially reflective surface. The metal rings may have any appropriate shape. For example, the rings may be circular, hexagonal, octagonal, etc. The metal rings need not all have the same shape. Multiple rows of metal rings may be provided. For example, at least two rows of metal rings may be spaced apart from each other in the forward direction of the base station antenna. Alternatively or additionally, multiple spaced-apart rows of rings may be provided between the two linear arrays.

By interposing an isolation wall that includes at least one partially reflective surface between two linear arrays of radiating elements, it may be possible to position the two linear arrays much closer together while those arrays will still generate antenna beams having acceptable shapes. Moreover, the isolation wall may improve the cross-polarization performance, the co-polarization performance, the self-isolation performance and/or the front-to-back ratio of the arrays. These isolation walls may also be designed to have little or no impact on the antenna beams generated by any mid-band linear arrays included in the base station antenna.

According to some embodiments of the present invention, base station antennas are provided that include a reflector, a first linear array of radiating elements extending forwardly from the reflector, the radiating elements in the first linear array configured to operate in a first frequency band, and a second linear array of radiating elements extending forwardly from the reflector, the radiating elements in the second linear array configured to operate in the first frequency band. These antennas further include an isolation wall that is positioned in between the first and second linear arrays of radiating elements. In some embodiments, the isolation wall may comprise at least one partially reflective surface that is configured to reflect, on average as a function of frequency, between 20% and 80% of incident radiation in the first frequency band. In other embodiments, the isolation wall may comprise a plurality of columns of metal rings and a first of the columns of metal rings is positioned behind the dipole radiators of the radiating elements in the first linear array of radiating elements so that the dipole radiators of the radiating elements in the first linear array of radiating elements overlap the first of the plurality of columns of metal rings in the forward direction. In still other embodiments, the isolation wall may comprise a plurality of metal rings and at least some of the metal rings may extend farther forwardly from the reflector than do the dipole arms of the radiating elements in the first and second linear arrays of radiating elements.

In some embodiments, a first of the plurality of columns of metal rings may be positioned forwardly of a second of the plurality of columns of metal rings. Additionally or alternatively, a second of the plurality of columns of metal rings and a third of the plurality of columns of metal rings may be spaced apart from each other in the transverse direction of the base station antenna. A fourth of the plurality of columns of metal rings may be spaced apart from both the second of the plurality of columns of metal rings and the third of the plurality of columns of metal rings in the transverse direction.

Embodiments of the present invention will now be discussed in more detail with reference to FIGS. 2A-6B.

As discussed above, it can be difficult to provide base station antennas that include two arrays of low-band radiating elements where the antenna has a width of less than 550 mm. Pursuant to embodiments of the present invention, base station antennas are provided that include two linear arrays of low-band radiating elements where the antenna has a width of less than 400 mm or even as small as 300 mm and still provide acceptable performance. As will be described in detail below, these narrower antennas may be achieved by including an isolation wall in the base station antenna that has one or more partially reflective surfaces between the two low-band linear arrays. FIGS. 2A-3C illustrate one such base station antenna 100 according to embodiments of the present invention.

Figure 2A:
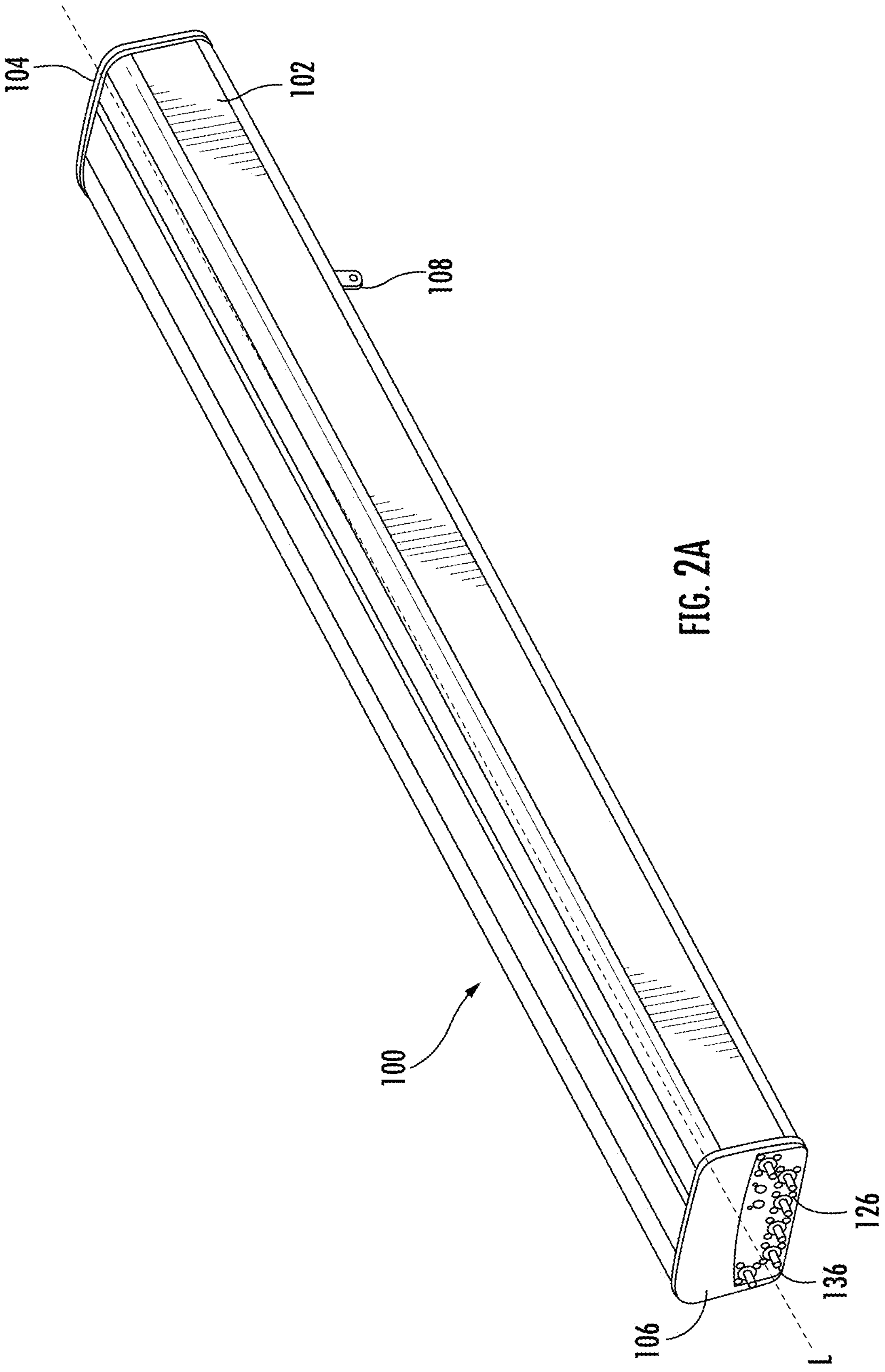
FIG. 2A is a perspective view of a base station antenna according to embodiments of the present invention.

Referring first to FIG. 2A, a perspective view of the base station antenna 100 is provided. As shown in FIG. 2A, the base station antenna 100 is an elongated structure that extends along a longitudinal axis L. The base station antenna 100 may have a tubular shape with generally rectangular cross-section. The base station antenna 100 includes a radome 102 and a top end cap 104. The base station antenna 100 also includes a bottom end cap 106 which includes a plurality of RF connectors 126, 136 mounted therein. One or more mounting brackets 108 may be provided on the rear side of the radome 102 which may be used to mount the base station antenna 100 onto an antenna mount (not shown) on, for example, an antenna tower. The base station antenna 100 is typically mounted in a vertical configuration (i.e., the longitudinal axis L may be generally perpendicular to a plane defined by the horizon when the base station antenna 100 is mounted for normal operation).

Figure 2B:
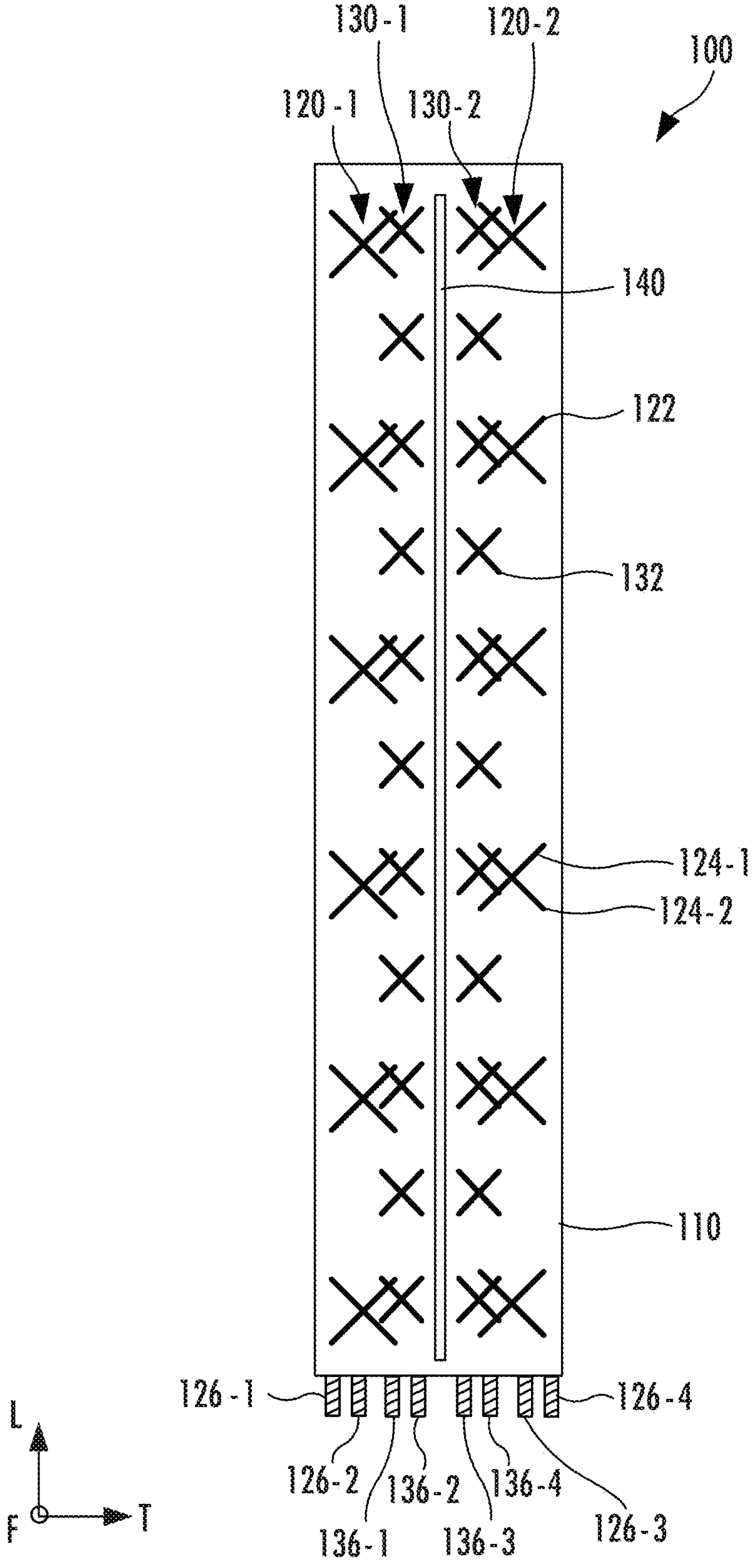
FIG. 2B is a schematic front view of the base station antenna of FIG. 2A with a radome thereof removed.

FIG. 2B is a schematic front view of the base station antenna 100 of FIG. 2A with the radome 102 removed to illustrate the radiating elements and an isolation wall that are included in the base station antenna 100. In FIG. 2B the radiating elements are illustrated by "X" shapes to simplify the drawing. A set of axes is provided in FIG. 2B that illustrates the longitudinal L, transverse T and forward F directions of the base station antenna 100.

As shown in FIG. 2B, the base station antenna 100 includes first and second linear arrays 120-1, 120-2 of low-band radiating elements 122 and first and second linear arrays 130-1, 130-2 of mid-band radiating elements 132. The low-band radiating elements 122 and the mid-band radiating elements 132 each extend forwardly from a reflector 110. The reflector 110 may comprise a sheet of metal that serves as a ground plane for the radiating elements 122, 132 and may redirect backwardly emitted radiation from the radiating elements 122, 132 in the forward direction.

Each linear array 120, 130 may extend along a respective axis that is parallel to a longitudinal axis L of the base station antenna 100. Since the longitudinal axis L of the base station antenna 100 will typically extend substantially vertically with respect to a horizontal plane defined by the horizon when the base station antenna 100 is mounted for use, the low-band and mid-band linear arrays 120, 130 may each be vertically-extending columns of radiating elements. The low-band and mid-band linear arrays 120, 130 may be spaced apart from each other in the transverse direction T of base station antenna 100. Each low-band radiating element 122 in the first linear array 120-1 is aligned in the transverse direction with a respective one of the low-band radiating elements 122 in the second linear array 120-2 so that the antenna 100 has a plurality of rows (here six rows) of low-band radiating elements 122, where each row has two low-band radiating elements 122 therein.

Each low-band radiating element 122 may be configured to operate in some or all of the 617-960 MHz "low-band" frequency range. Each low-band radiating element 122 may be a dual-polarization radiating element such as, for example, a center-fed slant −/+45° cross dipole radiating element that has a first dipole radiator 124-1 that is configured to transmit and receive slant +45° polarization RF radiation and a second dipole radiator 124-2 that is configured to transmit and receive slant −45° polarization RF radiation. Each mid-band radiating element 132 may be configured to operate in some or all of the 1427-2690 MHz "mid-band" frequency range. Each mid-band radiating element 132 may be a dual-polarization radiating element such as, for example, a center-fed slant –/+45° cross dipole radiating element.

The base station antenna 100 further includes first through fourth low-band RF ports 126-1 through 126-4 and first through fourth mid-band RF ports 136-1 through 136-4. Each RF port 126, 136 may have a connector interface that allows the RF port 126, 136 to connect to a port of an external radio (e.g., via a coaxial cable). Each low-band RF port 126 is connected to a respective low-band feed network (not shown). In particular, the first low-band feed network electrically connects the first RF port 126-1 to the first polarization (–45°) dipole radiators 124-1 of the radiating elements 122 in the first low-band linear array 120-1, the second low-band feed network electrically connects the second RF port 126-2 to the second polarization (+45°) dipole radiators 124-2 of the radiating elements 122 in the first low-band linear array 120-1, the third low-band feed network electrically connects the third RF port 126-3 to the first polarization (–45°) dipole radiators 124-1 of the radiating elements 122 in the second low-band linear array 120-2, and the fourth low-band feed network electrically connects the fourth RF port 126-4 to the second polarization (+45°) dipole radiators 124-2 of the radiating elements 122 in the second low-band linear array 120-2. Four mid-band feed networks (not shown) are similarly provided that connect each mid-band RF port 136 to either the first polarization dipole radiators or the second polarization dipole radiators of one of the mid-band linear arrays 130. The low-band and/or mid-band feed networks may also include respective electromechanical phase shifters that may impart an adjustable phase progression to the sub-components of the RF signals that are fed to the individual dipole radiators in order to apply an electrical downtilt to the antenna beams generated by the base station antenna 100 in response to RF signals input at each RF port 126, 136.

Still referring to FIG. 2B, the base station antenna 100 further includes an isolation wall 140 that is positioned forwardly of the reflector 110 and that is positioned in between the first and second linear arrays 120-1, 120-2 of low-band radiating elements 122 and between the first and second linear arrays 130-1, 130-2 of mid-band radiating elements 132. The isolation wall 140 may, for example, be mounted on the reflector 110. The isolation wall 140 may extend substantially the full lengths of the first and second low-band linear arrays 120-1, 120-2. The isolation wall 140 may include one or more partially reflective surfaces that are configured to reflect some, but not all, RF energy in the operating frequency band of the low-band radiating elements 122, as will be described in more detail below.

Figure 3A:
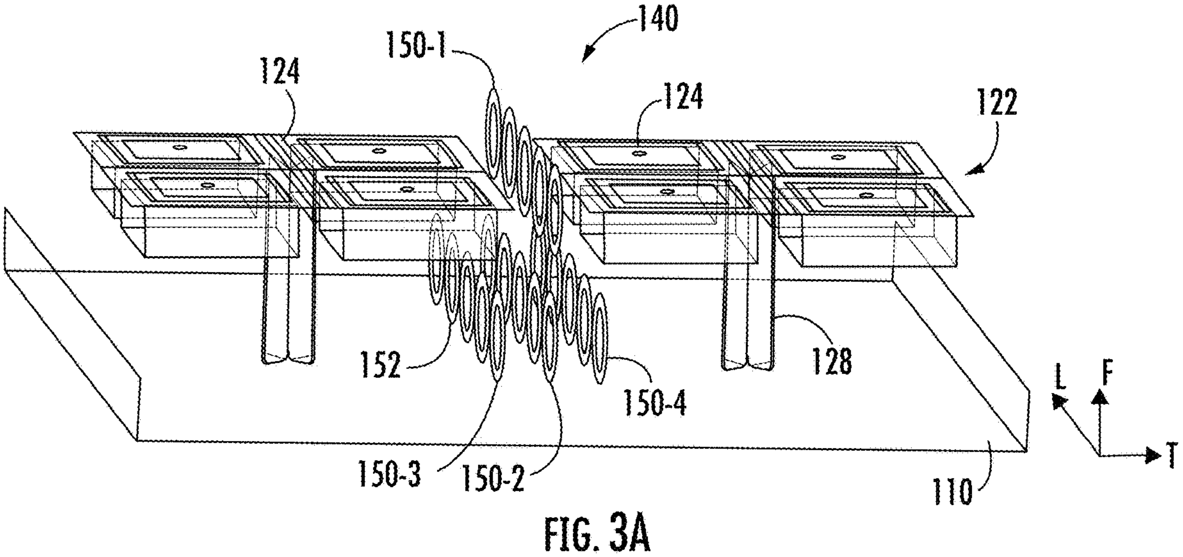
FIGS. 3A-3C are a schematic perspective, front and cross-sectional view of a row of the low-band radiating elements included in the base station antenna of FIGS. 2A-2B with the mid-band radiating elements omitted.
Figure 3B:
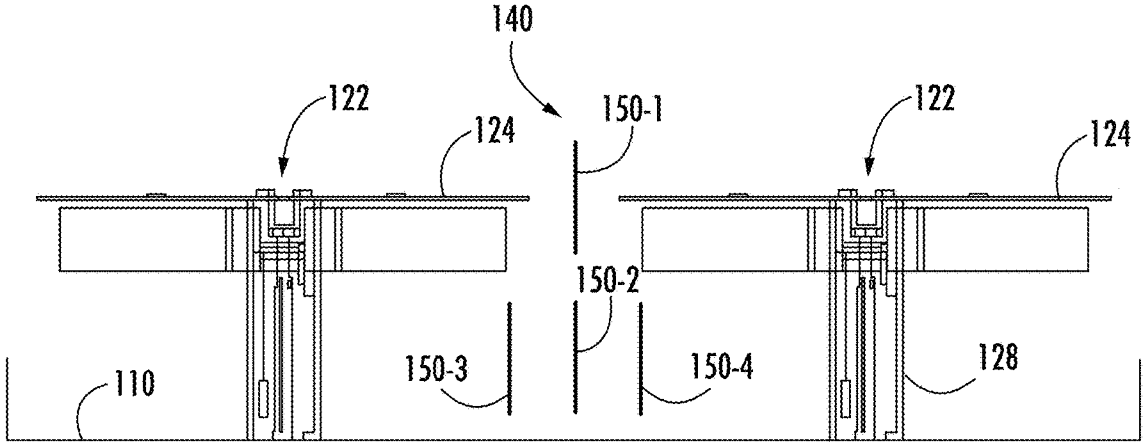
Figure 3C:
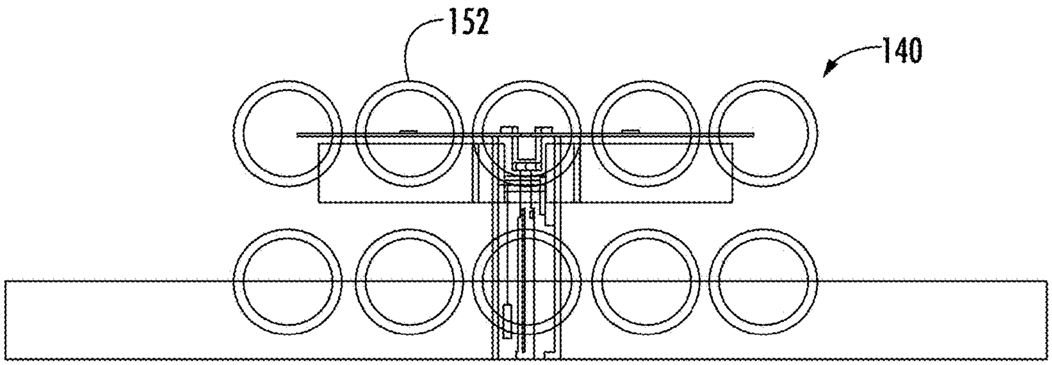

FIGS. 3A-3C are a schematic perspective, front and cross-sectional views of a small portion of the base station antenna 100 that corresponds to one row of two low-band radiating elements 122. The mid-band radiating elements 132 are omitted in FIGS. 3A-3C to more clearly illustrate the positioning of the isolation wall 140 between the two illustrated low-band radiating elements 122.

As shown best in FIG. 3A, the isolation wall 140 comprises a plurality of columns 150 of metal rings 152. Each column 150 of metal rings 152 extends in the longitudinal direction L. The columns 150 may extend continuously along the length of the base station antenna 100, or may have gaps where no metal rings 152 are provided (e.g., in regions between rows of low-band radiating elements 122).

Each column 150 of metal rings 152 may act as a partially reflective surface. Partially reflective surfaces are a known type of frequency selective surface. For example, partially reflective surfaces that are used to form planar lenses are described in an article entitled Microwave Planar Lens Antenna Designed With a Three-layer Frequency-Selective Surface, IEEE Antennas and Wireless propagation Letters, Vol. 16, at 904-907, 2017. As noted above, herein, a partially reflective surface refers to a surface that reflects, on average across the given frequency range, between 20% and 80% of the RF radiation in the given frequency range incident thereon. In other words, the average of the incident RF radiation that is reflected at each frequency in the given frequency range (measured at 1 MHz intervals) is between 20% and 80% of the incident RF radiation. The given frequency range may the operating frequency range of the two linear arrays 120 of low-band radiating elements 122 in some embodiments.

As shown, a first column 150-1 of metal rings 152 is positioned between the dipole radiators 124 of the low-band radiating elements 122. The metal rings 152 in the first column 150-1 may extend farther forwardly from the reflector 110 than the dipole radiators 124 in some embodiments, as can best be seen in FIG. 3C. Positioning the first column 150-1 of metal rings 152 so that at least a portion of the metal rings 152 extend farther forwardly than the dipole radiators 124 of the low-band radiating elements 122 may improve isolation between the two linear arrays 120-1, 120-2 of low-band radiating elements 122.

Still referring to FIG. 3A, a second column 150-2 of metal rings 152 is positioned rearwardly of the first column 150-1 of metal rings 152. In some embodiments, the first and second columns 150-1, 150-2 may be aligned in the transverse direction T of base station antenna 100 so that the two columns 150-1, 150-2 are stacked in the forward direction F. In addition, third and fourth columns 150-3, 150-4 of metal rings 152 are provided that may be on either side (in the transverse direction T) of the second column 150-2 of metal rings 152. With this arrangement, a total of three columns 150 (namely the second through fourth columns 150-2, 150-3, 150-4) of metal rings 152 are positioned in between the feed stalks 128 of the low-band radiating elements 122 in the first and second linear arrays 120-1, 120-2, while only a single column 150-1 of metal rings 152 is interposed between the dipole radiators 124 of the low-band radiating elements 122 in the first and second linear arrays 120-1, 120-2. A benefit of positioning more columns 150 of metal rings 152 in between the feed stalks 128 of the radiating elements 122 than are positioned between the dipole radiators 124 of the radiating elements will be discussed in more detail below with reference to FIGS. 5A-5B.

Figure 4A:
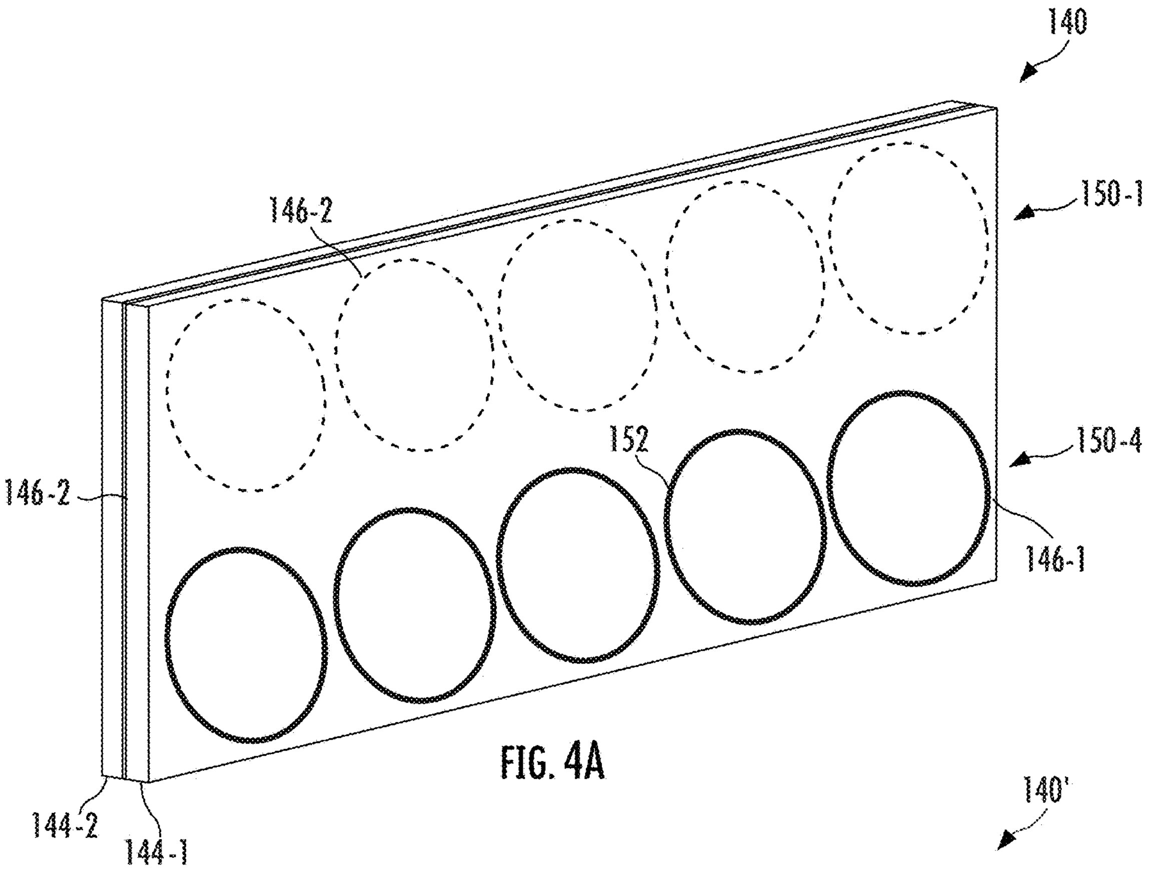
FIG. 4A is a schematic perspective view of the isolation wall included in the base station antenna of FIGS. 2A-3C.

In some embodiments, the isolation wall 140 may be implemented using one or more printed circuit boards. For example FIG. 4A is a schematic perspective view of a multi-layer printed circuit board 142 that is used to implement the isolation wall 140 in an example embodiment. As shown in FIG. 4A, the multi-layer printed circuit board 142 includes first and second dielectric substrates 144-1, 144-2 and first through third metallization patterns 146-1 through 146-3 that are formed on the dielectric substrates 144-1, 144-2 (metallization patterns 146-2 and 146-3 are not visible in FIG. 4A, although part of metallization pattern 146-2 is shown using dotted lines in the figure for context). The first metallization layer 146-1 is formed on the outer surface of the first dielectric substrate 144-1, the third metallization layer 146-3 is formed on the outer surface of the second dielectric substrate 144-2, while the second metallization layer 146-2 is formed on the inner surface of one of the first and second dielectric substrates 144-1, 144-2. Each metallization layer 146 may comprise one or more columns of metal rings 152 which may be formed by, for example, etching metal layers that are formed on the dielectric substrates 144 to remove all of the metal except for the rings 152.

Figure 4B:
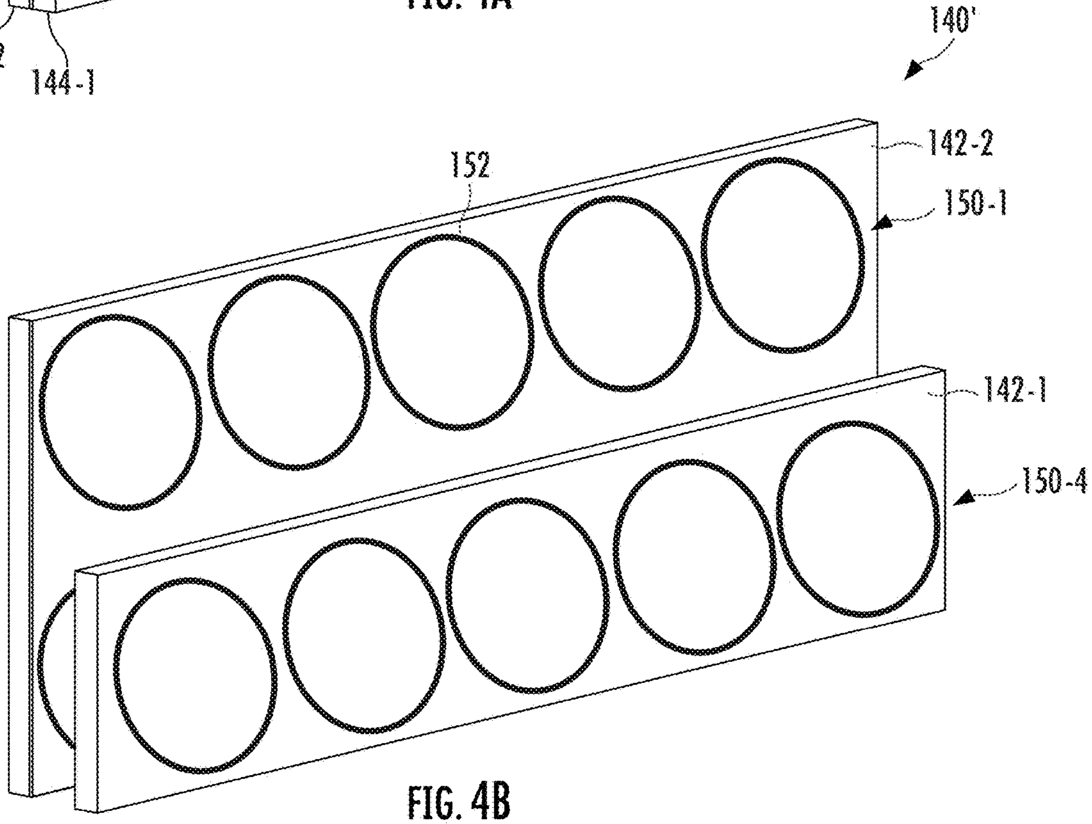
FIG. 4B is a schematic perspective view of another isolation wall according to embodiments of the present invention.

While FIG. 4A illustrates one example embodiment in which a single multi-layer printed circuit board 142 is used to implement the isolation wall 140, it will be appreciated that embodiments of the present invention are not limited thereto. For example, in other embodiments, three "single-layer" printed circuit boards may be used (which can be stacked or spaced apart from each other depending upon a desired spacing between the columns 150 of metal rings 152 in the transverse direction T) where each single-layer printed circuit board comprises a dielectric substrate with a metallization pattern (comprising one or more columns of 150 of metal rings 152) on one side thereof. In other embodiments, the isolation wall 140 may be implemented using a "double-layer" printed circuit board that comprises a dielectric substrate with a metallization pattern (comprising one or more columns of 150 of metal rings 152) on both major surfaces thereof and a single layer printed circuit board that comprises a dielectric substrate with a metallization pattern on one major surface thereof. In still other embodiments, the isolation wall 140 may be implemented as metallization patterns that are formed on dielectric substrates other than printed circuit board dielectric substrates or as sheet metal rings that are contained in a dielectric ring holder. It will also be appreciated that the isolation wall 140 may have any appropriate shape. For example, FIG. 4B illustrates an isolation wall 140' that is formed using a single layer printed circuit board 142-1 and a double-layer printed circuit board 142-2 that are spaced apart from each other in the transverse direction T.

In the depicted embodiments, the metal rings 152 are circular metal rings. Embodiments of the present invention are not limited thereto. For example, in other embodiments, the metal rings 152 a dielectric substrate with a metallization pattern (comprising one or more columns of 150 of metal rings 152) on both major surfaces thereof may be oval rings, hexagonal rings, octagonal rings, etc. The size of the metal rings 152, the width of the metal ring 152 (i.e., the difference between the inner and outer diameters of a circular metal ring 152), the spacing between the metal rings 152, and/or the shape of the metal ring 152 used may be selected to tune the partially reflective surface to be partially reflective in a preselected frequency range (e.g., in the operating frequency range of the low-band radiating elements 122) and/or to tune how much RF energy is reflected by the isolation wall 140. In some embodiments, the diameter of the metal ring 152 (assuming that circular metal rings 152 are used) may be between 0.15 and 0.40 wavelengths of the wavelength corresponding to the center frequency of the preselected frequency range. The amount of reflection may be increased, for example, by reducing the size of metal rings 152, the widths of the metal rings 152 and/or the spacing between adjacent metal rings 152.

As discussed above, more columns 150 of metal rings 152 may be provided in between the feed stalks 128 of the low-band radiating elements 122 than are provided between the dipole radiators 124 of the low-band radiating elements 122. As shown in FIGS. 3A and 3B, the distance between the dipole radiators 124 of the low-band radiating elements 122 in the first and second linear arrays 120-1, 120-2 may be very small As some separation is typically necessary between the isolation wall 140 and each low-band radiating element 122, and as some amount of separation is needed between two adjacent columns 150 of metal rings 152 (e.g., columns 150-2 and 150-3 or columns 150-2 and 150-4), there may only be room for positioning one column 150 of metal rings 152 in between the dipole radiators 124 of the radiating elements 122 from the first and second linear arrays 120-1, 120-2. However, as the distance between the feed stalks 128 of the radiating elements 122 from the first and second linear arrays 120-1, 120-2 is much greater, there may be room for two, three, four or even more columns 150 of metal rings 152 to be positioned between the feed stalks 128 of the radiating elements 122 from the first and second linear arrays 120-1, 120-2.

Figure 5A:
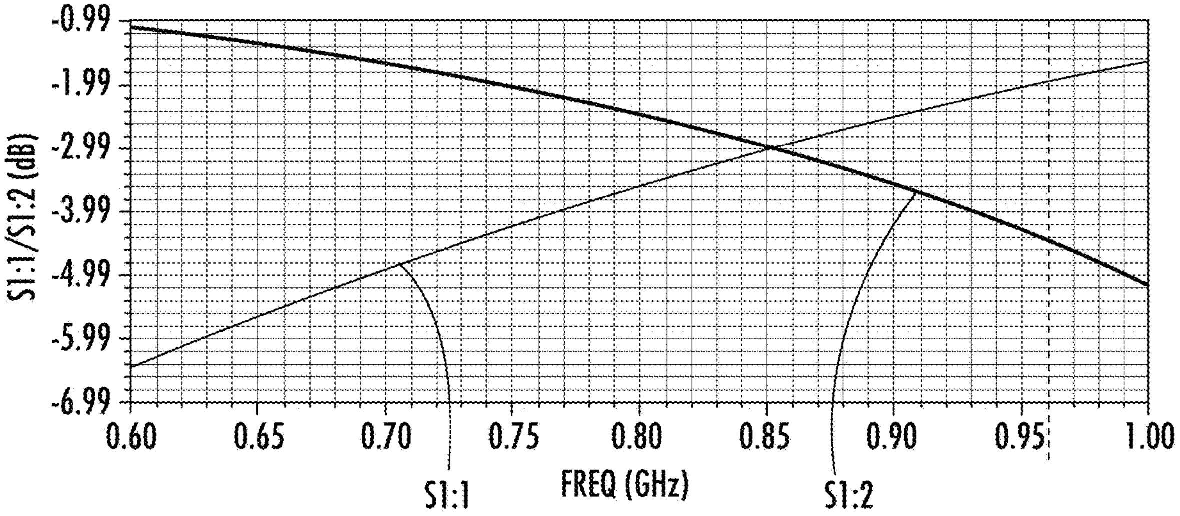
FIGS. 5A and 5B are graphs that illustrate the reflectivity of an isolation wall formed using a single column of metal rings (FIG. 5A) as compared to an isolation wall formed using three spaced apart columns of metal rings (FIG. 5B).
Figure 5B:
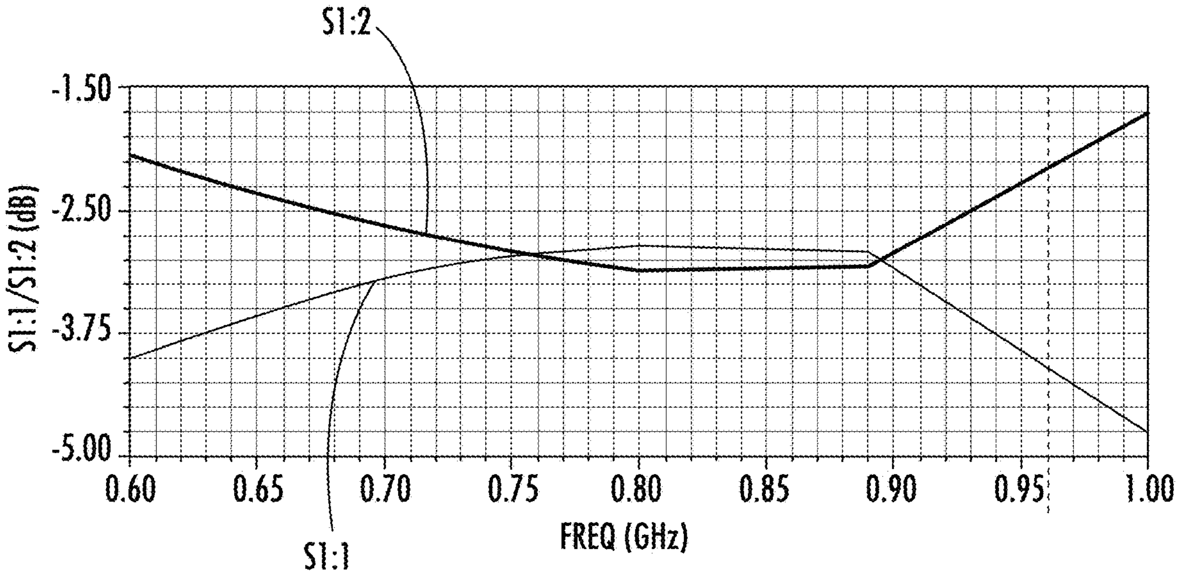

Referring to FIGS. 5A and 5B, graphs are provided that illustrate the reflectivity of an isolation wall formed using a single layer (column) of metal rings 152 (FIG. 5A) as compared to an isolation wall formed using three spaced apart layers (columns) of metal rings 152 (FIG. 5B). As shown in FIG. 5A, the return loss (curve S1:1) increases generally linearly with increasing frequency, while the insertion loss (curve S1:2) decreases generally linearly with increasing frequency. As such, at the lower end of the low-band frequency range (which in this graph is assumed to be 690 MHz) about 30% (−5.13 dB) of the incident RF energy is reflected by the metal rings 152, whereas at the upper end of the low-band frequency range (which in this graph is assumed to be 960 MHz) about 64% (−1.97 dB) of the incident RF energy is reflected by the metal rings 152. This results in an average amount of incident RF energy that is reflected being about 47%, but with a wide variation depending upon frequency.

In this particular embodiment, the ideal S1:1 and S1:2 values are about 3 dB for each parameter. As can be seen in FIG. 5A, this value is achieved where the two curves cross at about 850 MHz, but the S1:1 and S1:2 curves only achieve this value for a very narrow bandwidth. Thus, a design that includes a single layer of rings 152 may only achieve the ideal performance for a narrow frequency range.

As shown in FIG. 5B, reflection levels that are much more consistent with frequency can be obtained when three spaced-apart columns of metal rings are provided. In this case, both the return loss (curve S1:1) and the insertion loss (curve S1:2) exhibit much less variation with frequency within the low-band frequency range. As such, at the lower end of the low-band frequency range about 45% (−3.42 dB) of the incident RF energy is reflected by the metal rings 152, whereas at the upper end of the low-band frequency range about 39% (−4.04 dB) of the incident RF energy is reflected by the metal rings 152. The average amount of incident RF energy that is reflected is again about 47%, but with much less variation with frequency. In fact, both the S1:1 and S1:2 curves achieve the desired value of about 3 dB for a frequency range of about 750-910 MHz, and only depart significantly from 3 dB at the very upper end of the low-band frequency range. Thus, a design that includes three layers of rings 152 may achieve the ideal performance for most of the frequency range of interest.

Because three columns 150 of metal rings 152 are provided between the feed stalks 128 of the low-band radiating elements 122 in the first and second linear arrays 120-1, 120-2, the dipole radiators 124 of the low-band radiating elements 122 in the first linear array 120-1 may overlap the third column 150-3 of metal rings 152 in the forward direction, and the dipole radiators 124 of the low-band radiating elements 122 in the second linear array 120-2 may overlap the fourth column 150-4 of metal rings 152 in the forward direction. This can be seen in FIG. 3B. Herein, a first element overlaps a second element in the forward direction is an axis that extends in the forward direction (e.g., parallel to the reflector 110) passes through both elements.

As noted above, each column 150 of metal rings 152 may act as a partially reflective surface that reflects, on average, 20% to 80% of incident RF energy in a preselected frequency range. Each column 150 of metal rings 152 may also be configured so that substantially all (at least 90%, and more preferably at least 95% or at least 98%) of incident RF energy in the mid-band frequency range passes through each column 150 of metal rings 152. This may ensure that the isolation wall does not meaningfully impact the antenna beams that are generated by the first and second linear arrays 130-1, 130-2 of mid-band radiating elements 132.

Figure 6A:
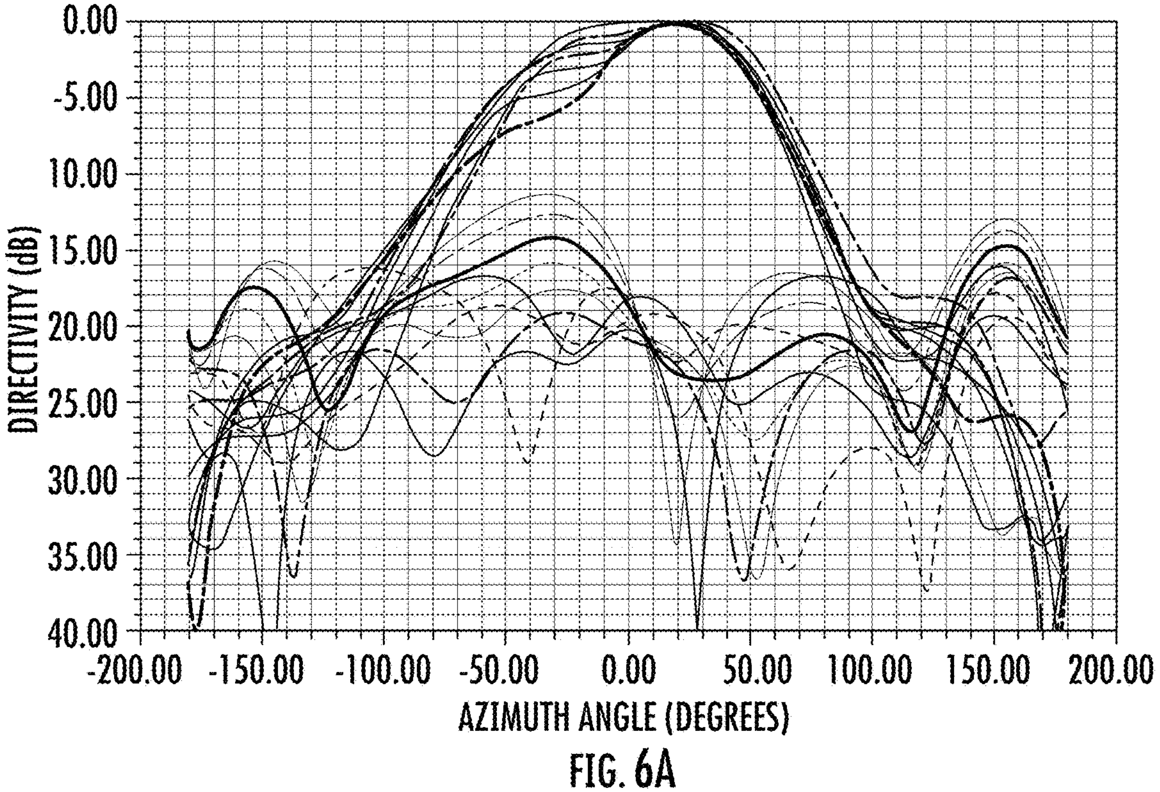
FIGS. 6A and 6B are graphs of the azimuth patterns generated by one of the low-band linear arrays of the base station antenna of FIGS. 2A-3C without and with the isolation wall, respectively.
Figure 6B:
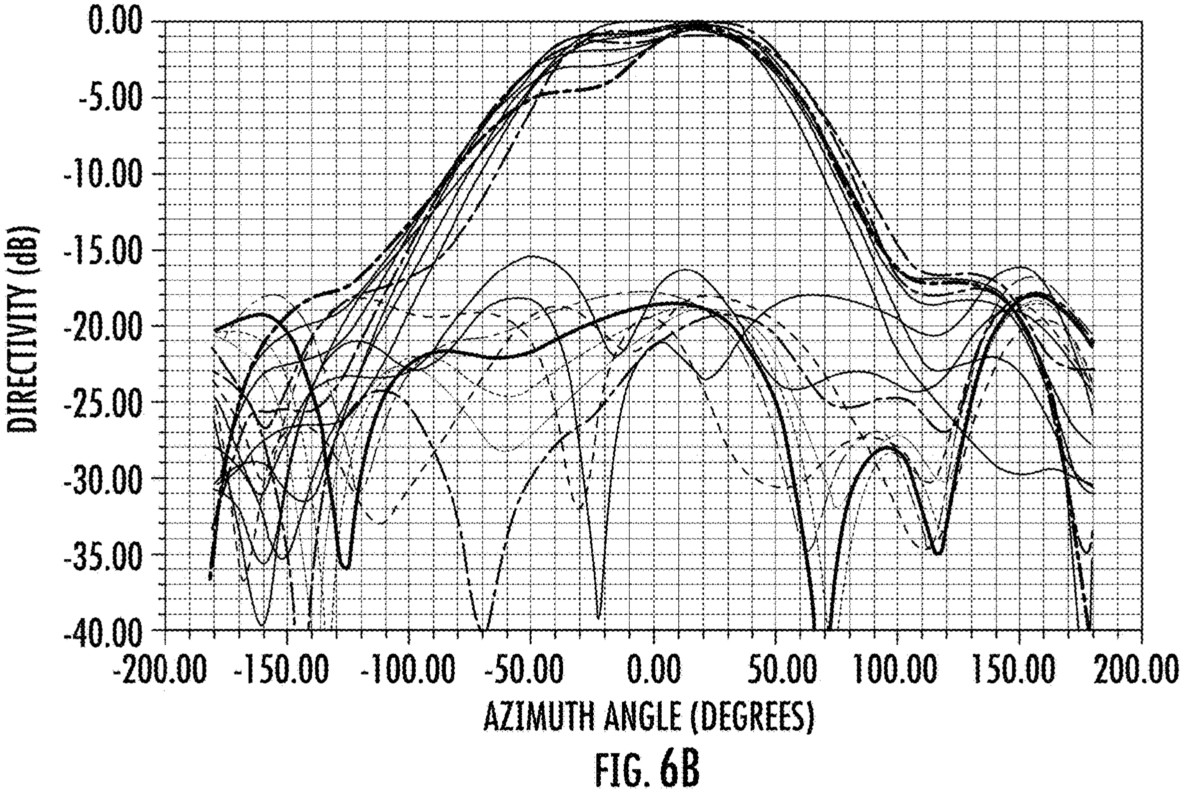

FIGS. 6A and 6B are graphs of the azimuth patterns generated by the first polarization radiators 124-1 of the first linear array 120-2 of low-band radiating elements 122 of base station antenna 100, where FIG. 6A illustrates the azimuth pattern if the isolation wall 140 is omitted, whereas FIG. 6B illustrates the azimuth pattern when the isolation wall 140 is included in the antenna 100. As can be seen in FIG. 6A, when the isolation wall 140 is omitted, the left side of the main lobe of the azimuth pattern has significant distortion (due to the first linear array 120-1 of low-band radiating elements 122). In addition, the cross-polarization levels are unduly high (about −11 dB) as are the first sidelobes (about −12.5 dB). In contrast, FIG. 6B shows that when the isolation wall is added the distortion in the left side of the main lobe of the azimuth pattern is reduced, and the cross-polarization and first sidelobes are reduced to acceptable levels (each are about −15 dB).

It will be appreciated that many modifications may be made to the above example embodiments without departing from the scope of the present invention. For example, the size, thickness and/or shape of the metal rings may be varied from what is shown herein. Likewise the number of columns of metal rings in both the forward and transverse directions may be varied from what is shown above.

While the example embodiments of the present invention discussed above are discussed above where the isolation walls according to embodiments of the present invention have partially reflective surfaces in the low-band frequency range, it will be appreciated that in other embodiments the isolation walls may have partially reflective surfaces in other frequency ranges such as, for example, the mid-band frequency range or the high-band frequency range. The use of such isolation walls having partially reflective surfaces in the high-band frequency range may be particularly advantageous in active antenna units that have multi-column beamforming arrays of high-band radiating elements, as the partially reflective surfaces may increase isolation between columns of such an array while still allowing for acceptable electronic scanning performance.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Herein, the term "substantially" refers to variation of less than 10%.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a reflector;

a first linear array of radiating elements positioned forwardly of the reflector and extending in a longitudinal direction, the radiating elements in the first linear array configured to operate in a first frequency band;

a second linear array of radiating elements positioned forwardly of the reflector and extending in the longitudinal direction, the radiating elements in the second linear array configured to operate in the first frequency band, the first and second linear arrays of radiating elements spaced apart from each other in a transverse direction that is perpendicular to the longitudinal direction; and an isolation wall positioned in between the first linear array of radiating elements and the second linear array of radiating elements, the isolation wall comprising a partially reflective surface that is configured to partially reflect incident radiation in the first frequency band, wherein the partially reflective surface comprises a plurality of columns of metal rings, wherein a first subset of the columns of metal rings are positioned a first distance in front of the reflector in a forward direction that is perpendicular to both the longitudinal direction and the transverse direction and a second subset of the columns of metal rings are positioned a second distance in front of the reflector in the forward direction, and wherein there are more columns of metal rings in the first subset than in the second subset.

2. The base station antenna of claim 1, wherein the second subset includes a single column of metal rings.

3. The base station antenna of claim 2, wherein the first distance is less than the second distance.

4. The base station antenna of claim 1, wherein the first subset includes at least two more columns of metal rings than the second sub-set.

5. The base station antenna of claim 4, wherein the first subset includes at least three columns of metal rings and the second sub-set includes a single column of metal rings.

6. The base station antenna of claim 1, wherein the columns of metal rings in the first subset are interposed between feed stalks of the radiating elements in the first linear array of radiating elements and feed stalks of the radiating elements in the second linear array of radiating elements, and the columns of metal rings in the second subset are interposed between dipole radiators of the radiating elements in the first linear array of radiating elements and dipole radiators of the radiating elements in the second linear array of radiating elements.

7. The base station antenna of claim 1, wherein a first of the first subset of the plurality of columns of metal rings is positioned behind dipole radiators of the radiating elements in the first linear array of radiating elements so that the dipole radiators of the radiating elements in the first linear array of radiating elements overlap the first of the first subset of the plurality of columns of metal rings in the forward direction.

8. The base station antenna of claim 1, wherein the partially reflective surface is configured to reflect, on average as a function of frequency, between 20% and 80% of incident radiation in the first frequency band.

9. A base station antenna, comprising:

a reflector;

a first linear array of radiating elements positioned forwardly of the reflector and extending in a longitudinal direction, the radiating elements in the first linear array configured to operate in a first frequency band;

a second linear array of radiating elements positioned forwardly of the reflector and extending in the longitudinal direction, the radiating elements in the second linear array configured to operate in the first frequency band, the first and second linear arrays of radiating elements spaced apart from each other in a transverse direction that is perpendicular to the longitudinal direction; and an isolation wall positioned in between the first linear array of radiating elements and the second linear array of radiating elements, the isolation wall extending in a forward direction that is perpendicular to the transverse direction, the isolation wall comprising one or more first columns of metal rings that are interposed between feed stalks of the radiating elements in the first linear array of radiating elements and feed stalks of the radiating elements in the second linear array of radiating elements, and one or more second columns of metal rings that are interposed between dipole radiators of the radiating elements in the first linear array of radiating elements and dipole radiators of the radiating elements in the second linear array of radiating elements, and wherein at least one of the first columns of metal rings does not overlap any of the second columns of metal rings in the forward direction.

10. The base station antenna of claim 9, wherein the isolation wall includes at least three first columns of metal rings.

11. The base station antenna of claim 10, wherein the isolation wall includes a single second column of metal rings.

12. The base station antenna of claim 11, wherein the isolation wall includes a total of three first columns of metal rings, and wherein the single second column of metal rings is aligned in the forward direction with a middle one of the three first columns of metal rings.

13. The base station antenna of claim 9, wherein the metal rings in the one or more second columns of metal rings extend farther forwardly from the reflector than do the dipole arms of the radiating elements in the first and second linear arrays of radiating elements.

14. The base station antenna of claim 9, wherein a first of the first columns of metal rings is positioned behind the dipole radiators of the radiating elements in the first linear array of radiating elements so that the dipole radiators of the radiating elements in the first linear array of radiating elements overlap the first of the first columns of metal rings in the forward direction.

15. A base station antenna, comprising:

a reflector;

a first linear array of radiating elements extending forwardly from the reflector, the radiating elements in the first linear array configured to operate in a first frequency band;

a second linear array of radiating elements extending forwardly from the reflector, the radiating elements in the second linear array configured to operate in the first frequency band; and an isolation wall positioned in between the first linear array of radiating elements and the second linear array of radiating elements, the isolation wall comprising one or more first columns of metal rings that are interposed between feed stalks of the radiating elements in the first linear array of radiating elements and feed stalks of the radiating elements in the second linear array of radiating elements, and one or more second columns of metal rings that are interposed between dipole radiators of the radiating elements in the first linear array of radiating elements and dipole radiators of the radiating elements in the second linear array of radiating elements, and wherein the isolation wall includes more first columns of metal rings than second columns of metal rings, wherein a first of the first columns of metal rings is positioned behind the dipole radiators of the radiating elements in the first linear array of radiating elements so that the dipole radiators of the radiating elements in the first linear array of radiating elements overlap the first of the first columns of metal rings in the forward direction.

16. A base station antenna, comprising:

a reflector;

a first linear array of radiating elements extending forwardly from the reflector, the radiating elements in the first linear array configured to operate in a first frequency band;

a second linear array of radiating elements extending forwardly from the reflector, the radiating elements in the second linear array configured to operate in the first frequency band;

and an isolation wall positioned in between the first linear array of radiating elements and the second linear array of radiating elements, wherein the isolation structure extends farther forwardly from the reflector than do dipole arms of the radiating elements in the first and second linear arrays of radiating elements, wherein the isolation wall includes a plurality of columns of metal rings, wherein a first of the plurality of columns of metal rings is positioned forwardly of a second of the plurality of columns of metal rings, wherein the first and second linear arrays of radiating elements extend in a longitudinal direction of the base station antenna, and are spaced apart from one another in a transverse direction of the base station antenna, and wherein the second of the plurality of columns of metal rings and a third of the plurality of columns of metal rings are spaced apart from each other in the transverse direction of the base station antenna, and wherein a fourth of the plurality of columns of metal rings is spaced apart from both the second of the plurality of columns of metal rings and the third of the plurality of columns of metal rings in the transverse direction.

17. The base station antenna of claim 16, wherein the first of the plurality of columns of metal rings is positioned forwardly of the second, third and fourth of the plurality of columns of metal rings.

18. The base station antenna of claim 16, wherein the third of the plurality of columns of metal rings is positioned behind the dipole radiators of the radiating elements in the first linear array of radiating elements so that the dipole radiators of the radiating elements in the first linear array of radiating elements overlap the third of the plurality of columns of metal rings in the forward direction.

* * * * *